United States Patent
Della Fiora et al.

[19]

[11] Patent Number: 6,130,822
[45] Date of Patent: *Oct. 10, 2000

[54] PIVOTABLE COMPUTER ACCESS DOOR STRUCTURE HAVING CONCEALED, BREAK-AWAY HINGE MECHANISM

[75] Inventors: Troy A. Della Fiora; Kevin W. Mundt, both of Spring; Ian Kung, Houston, all of Tex.

[73] Assignee: Compaq Computer Corporation, Houston, Tex.

[*] Notice: This patent is subject to a terminal disclaimer.

[21] Appl. No.: 09/083,791

[22] Filed: May 22, 1998

Related U.S. Application Data

[63] Continuation-in-part of application No. 08/871,124, Jun. 9, 1997.

[51] Int. Cl.[7] .................................. G06F 1/16; H05K 5/02
[52] U.S. Cl. ........................... 361/724; 361/683; 16/254; 16/DIG. 13
[58] Field of Search .................................... 361/683, 685, 361/724–727; 312/223.1, 223.2; 220/341, 334, 337, 342; 16/254, 260, 262, DIG. 13

[56] References Cited

U.S. PATENT DOCUMENTS

| | | | |
|---|---|---|---|
| 4,302,866 | 12/1981 | Irvin | 16/171 |
| 4,391,883 | 7/1983 | Williamson et al. | 429/97 |
| 5,316,168 | 5/1994 | Finch et al. | 220/341 |
| 5,349,132 | 9/1994 | Miller et al. | 174/35 R |
| 5,946,055 | 8/1999 | Rosen | 348/837 |

*Primary Examiner*—Lynn D. Feild

[57] ABSTRACT

A drive bay opening in the front bezel portion of a tower type computer CPU unit is provided with a swing-out plastic access door. The door is pivotable between a closed position and a full open stop position in which it is outwardly pivoted more than ninety degrees away from its closed position. A specially designed concealed, break-away hinge structure removably interconnects the access door and front bezel portion and includes a pair of hinge arms projecting outwardly from the door and molded integrally therewith. Outer end tabs in the hinge arms have apertures therein that rotatably receive hinge pins within recessed pocket areas in the bezel. In the event that the access door is forcibly pivoted outwardly beyond its full open stop position, separate disconnect pins disposed laterally outwardly of the hinge pins act as cams that torsionally deflect the hinge tabs out of engagement with the hinge pins. AS a result, the door simply pops off the bezel without damaging either the door, the hinge structure or the bezel. The hinge arm tabs of the separated, undamaged access door may subsequently be snapped back onto the hinge pins with chamfered edge portions of the tabs initially engaging domed portions of the hinge pins to torsionally deflect the tabs in a manner facilitating their reconnection to the hinge pins on the bezel.

28 Claims, 3 Drawing Sheets

FIG.2A
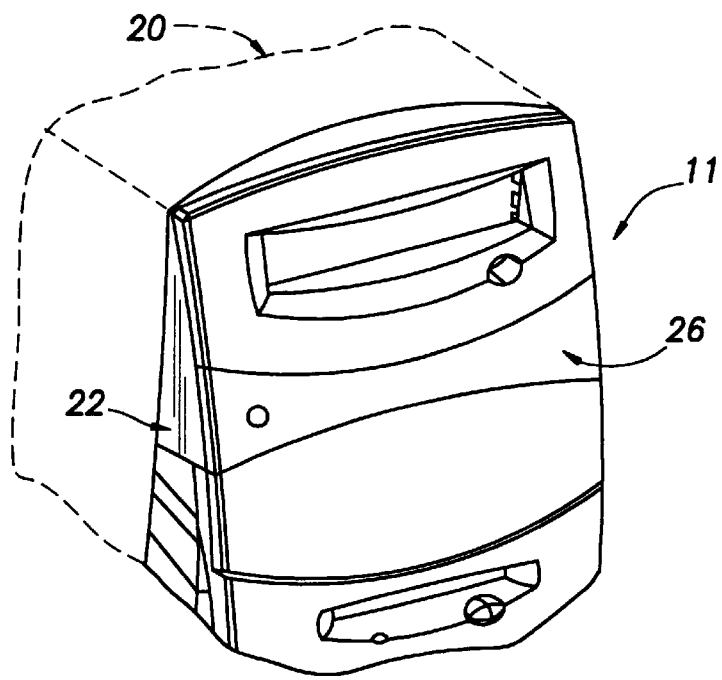
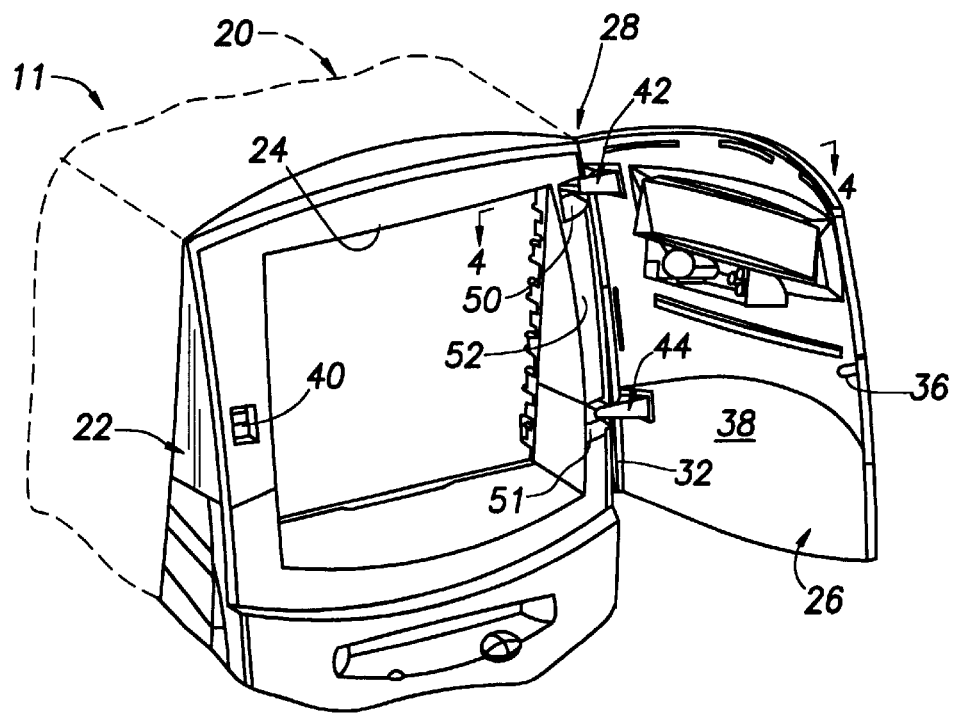
FIG.2B

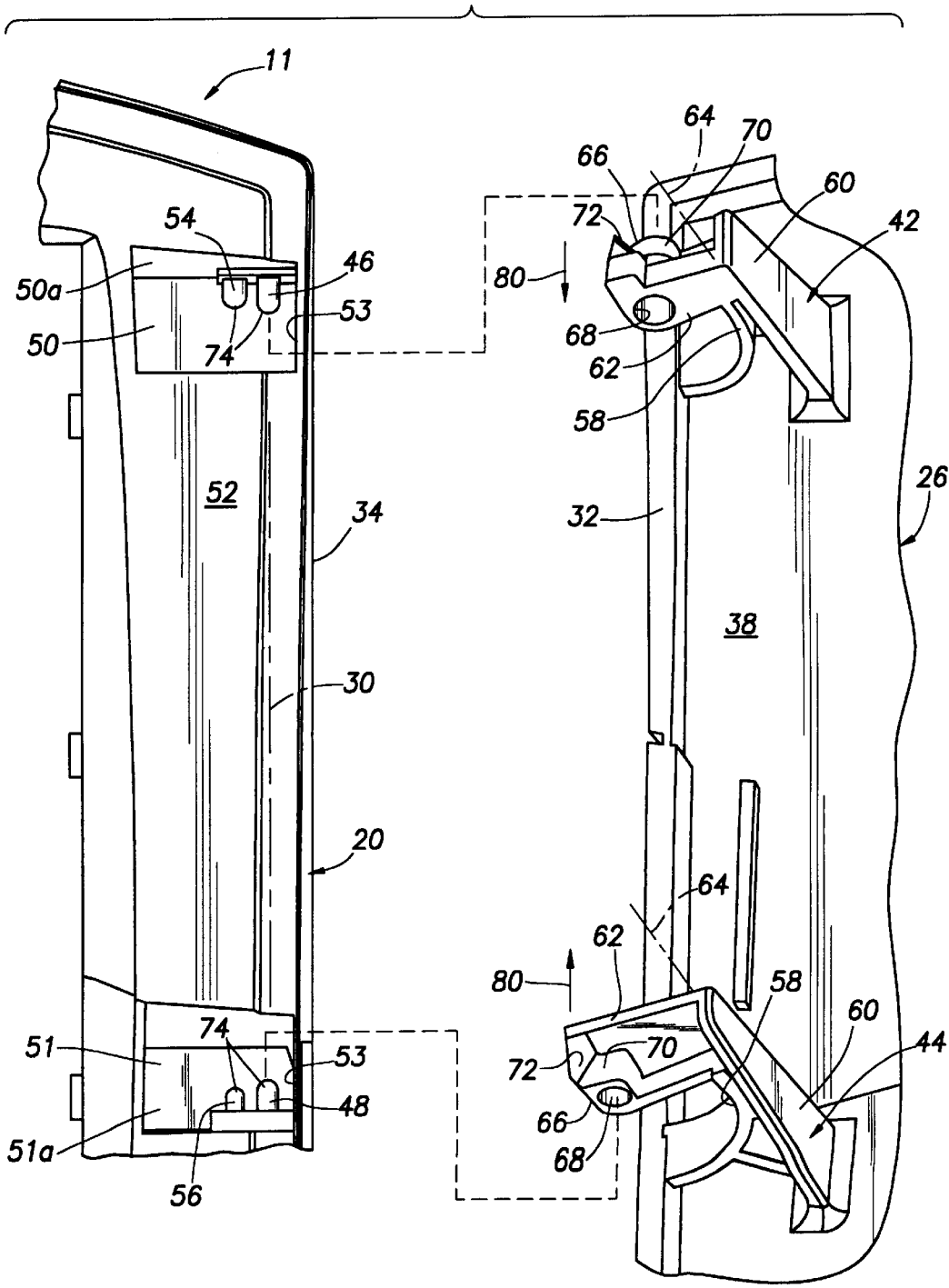

PIVOTABLE COMPUTER ACCESS DOOR STRUCTURE HAVING CONCEALED, BREAK-AWAY HINGE MECHANISM

CROSS-REFERENCE TO RELATED APPLICATION

This application is a continuation-in-part of U.S. application Ser. No. 08/871,124 filed on Jun. 9, 1997 and assigned to the same assignee as the present application now U.S. Pat. No. 5,815,379. Such copending application is hereby incorporated by reference herein in its entirety.

BACKGROUND OF THE INVENTION

1. Field of the Invention

The present invention generally relates to electronic devices such as computers and, in a preferred embodiment thereof, more particularly relates to access door structures installed on computer housings.

2. Description of Related Art

The housings of electronic devices such as computers are often formed of a molded plastic material and provided with exterior openings to afford user access to devices within the housing. An example of such a housing opening is a tower type computer drive bay opening extending through an outer front bezel portion of the computer housing structure. Housing openings of this sort are typically provided with an access door structure, also commonly of a molded plastic material, to selectively block and expose the housing opening. A common type of access door is one that is rotatable secured to the housing bezel, by a hinge structure, for pivotal movement relative thereto between (1) a closed position, in which the door extends across and covers the housing opening, and (2) an outwardly pivoted open limit position in which the opening is uncovered and the door is precluded from further opening movement by the abutment of an inner edge portion thereof with a facing portion of the bezel.

Hinged molded plastic access doors of this type are typically subject to several well known problems, limitations and disadvantages. For example, many of the access doors have exposed hinge structures which are subject to damage and tend to be unsightly. Other previously utilized access doors cannot be outwardly pivoted past about ninety degrees from their closed positions, thereby often hindering access to their associated bezel opening.

Yet another problem commonly associated with previously utilized hinged access doors of this sort is that if they are forcibly pivoted outwardly past their open limit position, breakage occurs in the door and/or the associated bezel structure portion requiring that one or both be replaced. In a previously proposed solution to this over-pivot breakage problem a computer housing access door was provided with a pair of outwardly projecting hinge arms having outer ends that rotatably engage hinge pin structures on the housing bezel structure.

Each hinge arm was formed from two releasably telescoped longitudinal sections which, when the door was pivoted outwardly past its open limit position, were designed to longitudinally separate from one another to permit the door and the inner hinge arm sections to break away from the ouster hinge arm sections, without damage thereto, in a manner permitting the undamaged door to be replaced on the bezel by re-telescoping the inner and outer hinge arm sections. This design, however, is relatively complex and expensive, and does not provide consistent damage-free break-away action for the access door.

As can readily be seen from the foregoing, a need exists for a pivotally supported computer housing opening access door which has a concealed hinge structure, has a total closed-to-fully open pivotal travel range of more than ninety degrees, and has damage free break-away and replacement capabilities.

SUMMARY OF THE INVENTION

In carrying out principles of the present invention, in accordance with a preferred embodiment thereof, an electronic device, representatively a tower type CPU unit portion of a computer system, has a housing with an external wall structure opening therein, illustratively a drive bay opening. The electronic device also includes an access door, and first and second interengaged hinge portions respectively carried by the access door and the housing.

The first and second interengaged hinge portions define a portion of a break-away hinge structure that operates to (1) support the access door for pivotal movement relative to the housing, about a pivot axis, between a closed position and an open limit position in which the access door respectively covers and uncovers the wall opening, and (2) permits the access door to be replaceably detached from the housing, in response to forcibly pivoting the access door outwardly beyond its open limit position, without damaging the door, the hinge portions or the housing.

To effect this replaceable detachment of the access door from the housing, the break-away hinge structure also includes a disconnect structure which is laterally offset from the hinge pivot axis and operates, in response to forcibly pivoting the access door outwardly beyond its open limit position, to create on one of the first and second hinge portions a resilient camming force which disengages it from the other hinge portion. Preferably, this camming force resiliently deflects one of the first and second hinge portions generally parallel to the pivot axis of the hinge structure.

According to other aspects of the invention, the hinge structure is concealed from view when the access door is closed, and permits the access door to be supported for pivotal movement between its closed and open limit positions through a rotational arc greater than ninety degrees to improve access to the housing wall opening.

In a preferred embodiment of the break-away hinge structure, the first hinge portion includes spaced first and second hinge arm members with body portions extending outwardly from the access door in first directions and having lateral cutout portions therein which facilitate the concealment of the hinge structure and the ability of the access door to pivot outwardly beyond ninety degrees to its open limit position. At the outer ends of these body portions are transverse mounting tabs which have circular mounting holes in their outer ends. Preferably, the access door and the two hinge arms are integral portions of a plastic molding.

The second hinge portion includes first and second hinge pin members, space apart along the pivot axis, which are preferably recessed in spaced apart hinge pocket areas of the housing wall structure and preferably have domed outer ends. With the access door operatively attached to the housing, these hinge pins are rotatable received in the hinge arm tab openings and support the access door for pivotal movement between its closed and open limit positions relative to the housing.

The disconnect structure representatively includes (1) a pair of disconnect pin members each positioned in a spaced apart, parallel relationship with one of the hinge pins, laterally offset from the hinge pivot axis, and having a domed outer end, and (2) a sloping cam surface formed on each of the hinge arm tabs and cammingly engageable by one of the domed outer ends of the disconnect pin members, in response to forcible pivotal movement of the access door outwardly beyond its open limit position, in a manner deflecting the hinge arm tabs generally parallel to the pivot axis and out of engagement with the hinge pins to thereby detach the access door from the housing.

The detached access door may be easily and quickly remounted on the housing by pressing sloping "lead-in" surfaces on the hinge arm tabs, adjacent the hinge pin openings therein, against the domed outer ends of the hinge pins to cause the tabs to be resiliently deflected, in directions generally parallel to the pivot axis, in a manner permitting the hinge pins to slide along the tabs and then operatively snap back into their hinge pin openings.

BRIEF DESCRIPTION OF THE DRAWINGS

FIG. 2A is a partially phantomed perspective view of a top front side portion of the CPU unit with the drive bay access door closed;

FIG. 2B is a partially phantomed perspective view of the top front side portion of the CPU unit with the drive bay access door opened to its limit position;

FIG. 3 is a simplified, enlarged scale exploded view, partially in elevation and partially in perspective, of a front side portion of the CPU unit and the access door removed therefrom, and illustrates a specially designed break-away hinge structure embodying principles of the present invention and used to releasably hold the access door on the CPU unit;

DETAILED DESCRIPTION

Figure 1:
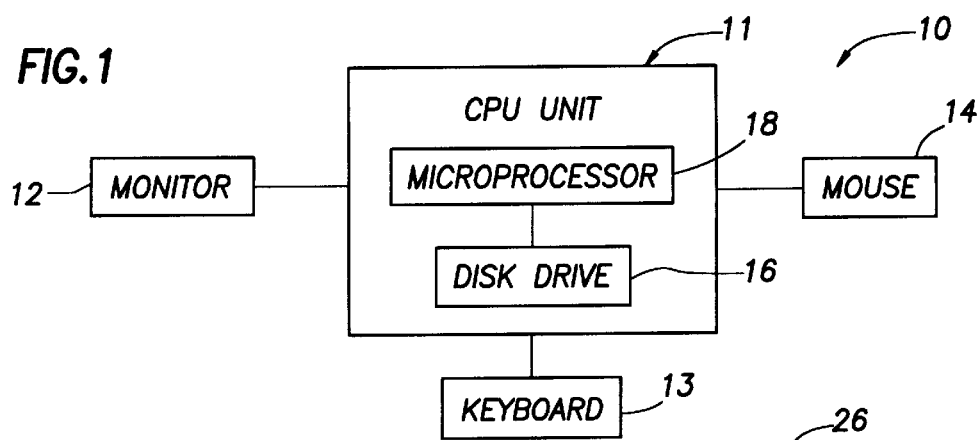
FIG. 1 is a schematic diagram of a computer system having incorporated therein a tower type CPU unit with a specially designed concealed hinge, break-away drive bay access door assembly embodying principles of the present invention.

Schematically illustrated in FIG. 1 is a representative computer system 10, the components of which are interconnected as shown and include a computer, illustratively in the form of a tower type CPU unit 11; a monitor 12; a keyboard 13; and a pointing device, representatively in the form of a mouse 14. In addition to various other components disposed therein, the CPU unit 11 has a data storage device, representatively a disk drive 16, for storing data that may be retrieved by a microprocessor 18 within the CPU unit 11.

As illustrated in FIGS. 2A and 2B, the CPU unit 11 has a generally rectangular housing portion 20 with a vertical front side portion being defined by a molded plastic bezel structure 22. Formed in an upper portion of the bezel 22 is a generally rectangular opening, representatively a drive bay opening 24. To selectively cover and uncover the opening 24, a generally rectangular molded plastic access door 26 is provided. Access door 26 is removably secured to the bezel 22 by a specially designed concealed, break-away hinge structure 28 (see FIGS. 2B, 4 and 5) which embodies principles of the present invention.

Hinge structure 28 removably mounts the access door 26 on the front bezel structure 22 for pivotal motion relative thereto, about a vertical pivot axis 30 (see FIGS. 3 and 5) between a closed position in which the access door 26 covers the housing wall structure opening 24 (see FIG. 2A), and an open limit position (see FIGS. 2B and 4) in which the access door 26 uncovers the opening 24. In its open limit position, the access door 26 is swung outwardly from its closed position through a rotational arc of more than ninety degrees, with an inturned inner side edge lip 32 of the door 26 (see FIGS. 2B, 3 and 4) bearing against a facing vertical outer right side wall portion 34 of the bezel 22 and blocking further outward pivotal movement of the opened door 26.

A conventional push-push type latch structure is provided for releasably holding the access door 26 in its closed position over the drive bay opening 24. This conventional latch structure includes a latch projection 36 formed on the inner side 38 of the access door 26, and a recessed detent structure 40 disposed on a front side of the bezel 22 outwardly adjacent the left side of the drive bay opening 24. When the access door 26 is pushed closed, the projection 36 is received and releasably locked within the recessed detent structure 40. When a left side edge portion of the closed access door 26 is subsequently pushed rearwardly, the detent structure 40 automatically releases the projection 36 and allows the door 26 to again be swung outwardly to its FIG. 2B open limit position.

According to a key feature of the present invention, as later described herein, if the access door 26 is forcibly pivoted outwardly beyond its open limit position (i.e., from its solid line position to its dotted line position in FIG. 4 as indicated by the arrow 41), the specially designed hinge structure 28 permits the access door 26 to simply pop off the bezel structure 22 without appreciably damaging the bezel structure 22, the access door 26 or the hinge structure 28. As also later described herein, the unique concealed hinge structure 28 also permits the detached access door 26 to be simply and quickly snapped back into operative pivotal mounting engagement with the bezel structure 22 without requiring tools of any sort.

Figure 5:
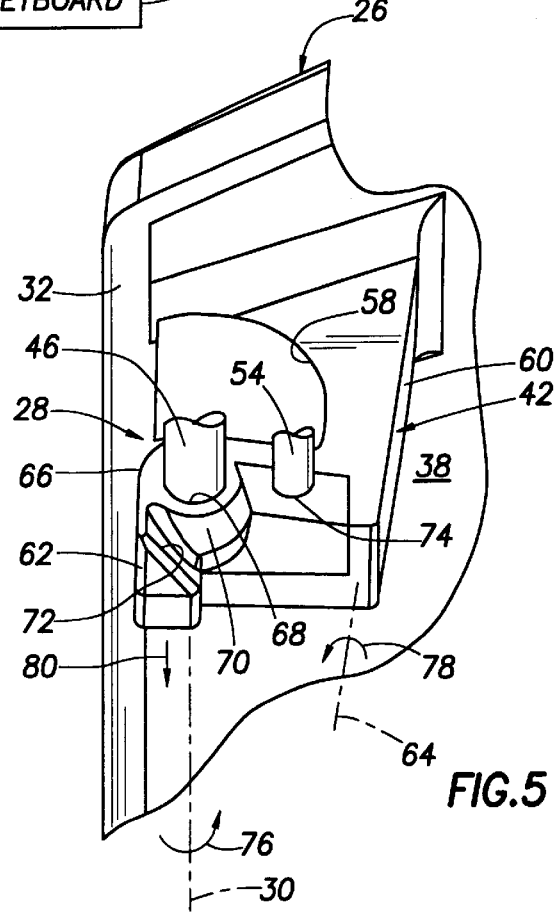
FIG. 5 is an enlarged scale inner side perspective view of an upper hinge arm area of the access door attached to the CPU unit and in its closed position.
Figure 4:
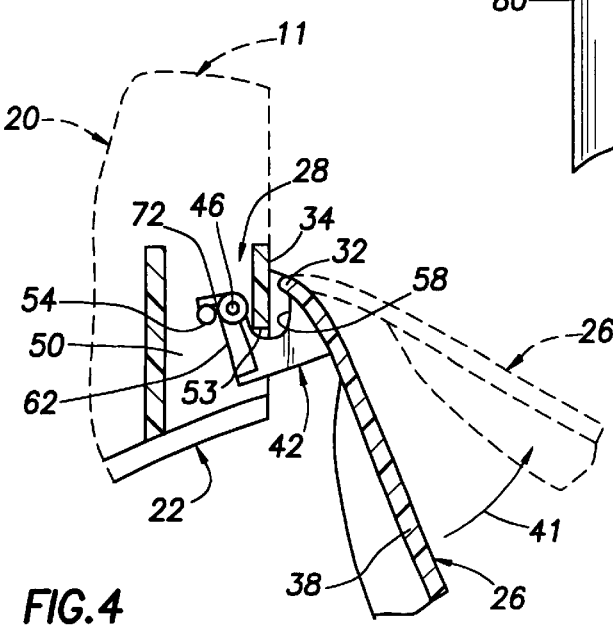
FIG. 4 is a simplified, enlarged scale cross-sectional view through an upper access door hinge area of the CPU unit taken along line 4—4 of FIG. 2B.

Turning now to FIGS. 3–5, the hinge structure 28 includes (1) upper and lower elongated hinge arm members 42,44 longitudinally extending inwardly from the inner side surface 38 of the access door 26 adjacent its inner side edge lip 32 (see FIGS. 2B–5); (2) upper and lower hinge pin members 46,48 (see FIGS. 2B–5) which are formed on the bezel structure 22, vertically spaced apart along the pivot axis 30, and respectively disposed in forwardly opening upper and lower hinge pockets 50,51 formed in a vertical front side wall portion 52 of the bezel 22 adjacent upper and lower inner side notches 53a,53b in its side wall portion 34 (see FIGS. 3 and 4); and (3) upper and lower disconnect pin members 54,56 which are formed on the bezel structure 22 in the indicated parallel, laterally spaced relationships with the hinge pins 46,48 in the upper and lower pocket areas 50 and 51.

Each of the upper and lower hinge arms 42,44 is preferably molded as an integral part of the plastic access door 26 and has a relatively small vertical thickness, a longitudinally intermediate cutout area 58 horizontally extending into the hinge arm body and forming a narrowed body portion 60 in the hinge arm, and a horizontally projecting transverse outer tab portion 62 which is generally perpendicular to the longitudinal axis 64 of the body portion 60 and to the pivot axis 30. Extending vertically through the outer end of each tab portion 62 is a vertically oriented tubular portion 66 with a circularly cross-sectioned mounting opening 68 extending axially therethrough.

For purposes later described herein, each of the hinge arm tubular portions 66 has a rear outer side surface 70 thereon (see FIGS. 3 and 5) which is sloped relative to the pivot axis 30. The upper tubular portion side surface 70 is sloped upwardly and forwardly relative to the rear or inner side surface 38 of the access door 26, and the lower tubular portion side surface 70 is sloped downwardly and forwardly relative to the rear side surface 38 of the access door 26.

Additionally, a pair of ramped disconnect surfaces 72 are formed on the outer ends of the hinge arm tabs 62 rearwardly of their tubular portions 66. The ramped disconnect surfaces 72 face rightwardly as viewed from the rear side of the access door 26 in FIG. 3, with the upper ramped disconnect surface 72 being sloped downwardly and rightwardly, and the lower ramped disconnect surface 72 sloping upwardly and rightwardly. As best illustrated in FIG. 3, the free lower ends of the upper pins 46 and 54, and the free upper ends of the lower pins 48 and 56, are domed as at 74.

The upper pin members 46,54 extend downwardly from an upper wall portion 50a of the upper hinge pocket 50 (see FIG. 3), and the lower pin members 48,56 extend upwardly from a bottom wall portion 51a of the lower hinge pocket 51. With the access door 26 operatively mounted on the front side of the bezel 22, the upper and lower hinge pins 46 and 48, which are slightly longer than the upper and lower disconnect pins 54 and 56, are pivotally and removably received in the circular openings 68 in the hinge arm tab portions 62 and form with the interior surfaces of the openings 68 upper and lower pivot locations spaced apart along the vertical pivot axis 30. The upper hinge pin 46 extends downwardly into the tab opening 68 of the upper hinge arm 42, and the lower hinge pin 48 extends upwardly into the tab opening 68 of the lower hinge arm 44.

As can be seen in FIG. 4, the cutout areas 58 in the upper and lower hinge arms 42,44 facilitate the access door 26 being able to be outwardly rotated from its closed position through an arc of more than ninety degrees, to provide easier insertion and removal access to the drive bay opening 24, by permitting a forward edge section of the bezel wall portion 34 to enter the cutout areas 58. The notches 53 in the front edge of the bezel wall portion 34 also facilitate this pivoting past the ninety degree mark, as additionally illustrated in FIG. 4.

When the access door 26 is in its FIG. 2A closed position, the hinge structure 28 is completely concealed from view behind the closed door 26. This hinge structure concealment is facilitated by the tab cutout areas 58 which permit the hinge pins 46,48 to be rearwardly recessed into the upper and lower hinge pockets 50 and 51.

As previously mentioned, an additional advantage provided by the hinge structure 28 is that it permits the access door 26 to be "broken away" from the bezel structure 22, and then replaced thereon, without damage to the bezel structure 22, the access door 26 or the hinge structure 28 when the door 26 is inadvertently (or intentionally) pivoted outwardly past its solid line open limit position (as indicated by the arrow 41 in FIG. 4) to the door's dashed line detached position also shown in FIG. 4.

The upper and lower disconnect pins 54,56 form with the ramped surfaces 72 on the tab portions 62 of the upper and lower hinge arms 42,44 a disconnect portion of the hinge structure 28. As illustrated, this disconnect portion, relative to the pivot axis 30, is laterally offset from the hinge pin/hinge arm pivot locations. With the access door 26 in its solid line open limit position (see FIG. 4), rear portions of the domed outer end surfaces 74 of the upper and lower disconnect pins 54,56 are positioned in front of and engage the ramped surfaces 72 on the tab portions 62 of the upper and lower hinge arms 42 and 44. In contrast, as shown in FIG. 5, when the access door 26 is closed, these ramped hinge arm tab surfaces 72 are pivoted out of engagement with the disconnect pins 54 and 56.

Referring now to FIGS. 3–5, when the access door 26 is swung outwardly from its closed position to its open limit position, as indicated by the arrow 76 in FIG. 5, the ramped disconnect surfaces 72 on the hinge arm tab portions 62 are pivoted into engagement with the domed outer ends 74 of their associated disconnect pins 54 and 56 as indicated (for the upper disconnect pin 54) in FIG. 4. As the access door 26 is subsequently forced outwardly beyond its open limit position, as indicated by the arrow 41 in FIG. 4, a camming engagement between the domed outer ends 74 of the upper and lower disconnect pins 54,56 and their associated ramped disconnect surfaces 72 on the upper and lower hinge arms 42,44 torsionally deflects the hinge arm tabs 62 about the longitudinal hinge arm axes 64, as indicated for he upper tab 62 by the arrow 78 in FIG. 5.

In turn, this causes the tabs 62 to be deflected toward one another along the pivot axis 30, as indicated by the arrows 80 in FIGS. 3 and 5, to disengage the upper and lower hinge arm tabs 62 from the upper and lower hinge pins 46 and 48 and detaching the access door 26 from the bezel 22 without damaging the bezel 22, the access door 26 or the hinge structure 28. After the hinge arm tabs 62 are disconnected from the hinge pins 46,48 the deflected tabs 62 simply spring back to their original positions as shown in FIG. 3.

To operatively reattach the separated access door 26 to the bezel 22 easily, quickly and without tools of any sort, all that is necessary it to position the door 26 in a generally closed orientation in a manner such that the ramped tab surfaces 70 (see FIGS. 3 and 5) engage the domed ends 74 of the upper and lower hinge pins 46,48 and then push the door 26 rearwardly toward the hinge pins 46,48. This causes a camming interaction between the domed ends 74 of the hinge pins 46,48 and the ramped tab surfaces 70 that resiliently deflects the tabs 62 toward one another along the pivot axis 30 in a manner similar to that shown by the arrows 80 in FIG. 3, thereby permitting the domed ends 74 of the hinge pins 46,48 to slide across the outer ends of the tubular tab portions 66 (i.e., the top end of the upper tab tubular portion 66 and the bottom end of the lower tubular portion 66) until the upper and lower hinge pins 46,48 snap back into their associated tab openings 68 to rotationally reattach the tabs 62 to the upper and lower hinge pins 46 and 48.

While the access door 26 and the associated concealed, break-away hinge structure 28 have been illustrated as being incorporated in conjunction with a drive bay opening in a tower type CPU unit, it will be readily appreciated by those of skill in this particular art that the door mounting principles of the present invention could alternatively be utilized to advantage with other types of wall openings in other structures such as, for example, other types of computers and electronic device housings.

The foregoing detailed description is to be clearly understood as being given by way of illustration and example only, the spirit and scope of the present invention being limited solely by the appended claims.

What is claimed is:

1. An electronic device comprising:
   a housing having a wall opening therein;
   an access door;
   first and second hinge portions respectively carried by said access door and said housing and releasably interengaged at pivot locations spaced apart along a pivot axis, said first and second hinge portions supporting said access door for pivotal movement relative to said housing, about said pivot axis, between a closed position and an open limit position in which said access door respectively covers and uncovers said wall opening; and a disconnect structure offset from said pivot locations and operative to cammingly disengage said first and second hinge portions, to thereby release said access door from said housing, in response to forcibly pivoting said access door outwardly beyond said open limit position.

2. The electronic device of claim 1 wherein said electronic device is a computer.

3. The electronic device of claim 2 wherein said computer is a tower CPU unit.

4. The electronic device of claim 2 wherein said wall opening is a drive bay opening.

5. The electronic device of claim 1 wherein:

said disconnect structure is operative to cammingly deflect said first hinge portion out of engagement with said second hinge portion in a direction generally parallel to said pivot axis.

6. The electronic device of claim 5 wherein:

said first hinge portion includes spaced apart first and second hinge arms projecting outwardly from said access door and having outer end portions with openings formed therein, said second hinge portion includes a pair of hinge pins carried by said housing and rotatable received in said openings in said hinge arm outer end portions, and said disconnect structure includes cooperating first and second cam surface portions respectively associated with said housing and said hinge arms and being cammingly engageable during pivotal movement of said access door outwardly away from said open limit position.

7. The electronic device of claim 6 wherein said disconnect structure includes:

a pair of disconnect pins carried by said housing in a laterally spaced, parallel relationship with said hinge pins and having domed end portions defining said first cam surface portion, and a pair of ramped surfaces formed on said hinge arm outer end portions and defining said second cam surface portion.

8. The electronic device of claim 1 wherein said disconnect structure, relative to said pivot axis, is transversely offset from said pivot locations.

9. The electronic device of claim 1 wherein:

said first hinge portion includes spaced apart first and second hinge arms projecting outwardly from said access door and having outer end portions with openings formed therein, said second hinge portion includes a pair of hinge pins carried by said housing and rotatably received in said openings in said hinge arm outer end portions, said hinge pins having domed outer ends, and said hinge arm outer end portions have ramped surfaces that may be forced against said domed outer hinge pin ends to resiliently deflect said hinge arm outer end portions in a manner facilitating the entry of said hinge pins into said openings in said hinge arm outer end portions to pivotally attach said access door to said housing.

10. The electronic device of claim 1 wherein:

said disconnect structure is operative to disengage said first and second hinge portions in a manner leaving said second hinge portion in place on said housing.

11. A computer system comprising a CPU unit having a microprocessor and a data storage device for storing data that may be retrieved by said microprocessor, said CPU unit further comprising:

a housing having a wall opening therein;

an access door;

first and second hinge portions respectively carried by said access door and said housing and releasably interengaged at pivot locations spaced apart along a pivot axis, said first and second hinge portions supporting said access door for pivotal movement relative to said housing, about said pivot axis, between a closed position and an open limit position in which said access door respectively covers and uncovers said wall opening; and a disconnect structure offset from said pivot locations and operative to cammingly disengage said first and second hinge portions, to thereby release said access door from said housing, in response to forcibly pivoting said access door outwardly beyond said open limit position.

12. The computer system of claim 11 further comprising a monitor and a keyboard each operatively connectable to said CPU unit.

13. The computer system of claim 11 wherein said CPU unit is a tower CPU unit.

14. The computer system of claim 11 wherein said wall opening is a drive bay opening.

15. The computer system of claim 11 wherein:

said disconnect structure is operative to cammingly deflect said first hinge portion out of engagement with said second hinge portion in a direction generally parallel to said pivot axis.

16. The computer system of claim 15 wherein:

said first hinge portion includes spaced apart first and second hinge arms projecting outwardly from said access door and having outer end portions with openings formed therein, said second hinge portion includes a pair of hinge pins carried by said housing and rotatably received in said openings in said hinge arm outer end portions, and said disconnect structure includes cooperating first and second cam surface portions respectively associated with said housing and said hinge arms and being cammingly engageable during pivotal movement of said access door outwardly away from said open limit position.

17. The computer system of claim 16 wherein said disconnect structure includes:

a pair of disconnect pins carried by said housing in a laterally spaced, parallel relationship with said hinge pins and having domed end portions defining said first cam surface portion, and a pair of ramped surfaces formed on said hinge arm outer end portions and defining said second cam surface portion.

18. The computer system of claim 11 wherein said disconnect structure, relative to said pivot axis, is transversely offset from said pivot locations.

19. The computer system of claim 11 wherein:

said first hinge portion includes spaced apart first and second hinge arms projecting outwardly from said access door and having outer end portions with openings formed therein, said second hinge portion includes a pair of hinge pins carried by said housing and rotatably received in said openings in said hinge arm outer end portions, said hinge pins having domed outer ends, and said hinge arm outer end portions have ramped surfaces that may be forced against said domed outer hinge pin ends to resiliently deflect said hinge arm outer end portions in a manner facilitating the entry of said hinge pins into said openings in said hinge arm outer end portions to pivotally attach said access door to said housing.

20. The computer system of claim 11 wherein:

said disconnect structure is operative to disengage said first and second hinge portions in a manner leaving said second hinge portion in place on said housing.

21. An electronic device comprising:

a housing having a wall opening therein;

an access door;

first and second cooperatively engageable means on said access door and said housing for supporting said access door on said housing for pivotal movement relative thereto between a closed position and an open limit position in which said access door respectively covers and uncovers said wall opening;

third means carried on said first means; and fourth means carried by said housing in a spaced apart relationship with said second means, said third and fourth means being cooperatively engageable, in a manner disengaging said first and second means and freeing said access door from said housing, in response to a forcible pivoting of said access door outwardly past said open limit position thereof.

22. The electronic device of claim 21 wherein said third and fourth means are operative to resiliently deflect said first means out of engagement with said second means.

23. The electronic device of claim 22 wherein:

the pivotal movement of said access door is about a pivot axis, and said third and fourth means are operative to resiliently deflect said first means in a direction generally parallel to said pivot axis.

24. The electronic device of claim 21 wherein, with said access door freed from said housing, said first means remain with said access door and said second means remain with said housing.

25. The electronic device of claim 21 further comprising:

fifth means disposed on said first means and being forcibly engageable with said second means in a manner resiliently deflecting said first means and causing operative reattachment thereof to said second means to reconnect the freed access door to said housing.

26. The electronic device of claim 21 wherein said electronic device is a computer.

27. The electronic device of claim 26 wherein said computer is a tower CPU unit.

28. The electronic device of claim 27 wherein said wall opening is a drive bay opening.

* * * * *